United States Patent
Vinogradov et al.

(10) Patent No.: US 8,876,006 B2
(45) Date of Patent: Nov. 4, 2014

(54) COMPACT IMAGING MODULE WITH ADJUSTABLE AIMING PATTERN AND ARRANGEMENT FOR AND METHOD OF SPATIALLY ADJUSTING THE AIMING PATTERN

(71) Applicant: Symbol Technologies, Inc., Schaumburg, IL (US)

(72) Inventors: Igor R. Vinogradov, Oakdale, NY (US); Yuly Mitelman, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 14 days.

(21) Appl. No.: 13/660,386

(22) Filed: Oct. 25, 2012

(65) Prior Publication Data
US 2014/0117092 A1 May 1, 2014

(51) Int. Cl.
*G06K 7/10* (2006.01)
(52) U.S. Cl.
USPC ..................... 235/473; 235/462.21
(58) Field of Classification Search
USPC ............... 235/473, 462.21, 462.24
See application file for complete search history.

(56) References Cited

U.S. PATENT DOCUMENTS

| | | | |
|---|---|---|---|
| 5,850,078 A | 12/1998 | Giordano et al. | |
| 7,021,542 B2 | 4/2006 | Patel et al. | |
| 8,030,630 B2 | 10/2011 | Tan et al. | |
| 8,196,834 B2 | 6/2012 | Vinogradov et al. | |
| 2009/0059616 A1* | 3/2009 | Wittenberg et al. | 362/558 |
| 2009/0108076 A1* | 4/2009 | Barkan et al. | 235/462.48 |
| 2010/0155487 A1 | 6/2010 | Liu et al. | |
| 2011/0268453 A1* | 11/2011 | Fest et al. | 398/129 |
| 2012/0016851 A1 | 1/2012 | Hrle et al. | |
| 2012/0097744 A1 | 4/2012 | Drzymala et al. | |
| 2012/0168509 A1* | 7/2012 | Nunnink et al. | 235/455 |

FOREIGN PATENT DOCUMENTS

WO 165469 A1 9/2001

OTHER PUBLICATIONS

International Search Report and Written Opinion for counterpart International Patent Application No. PCT/US2013/063030 mailed Dec. 13, 2013.

* cited by examiner

*Primary Examiner* — Sonji Johnson
(74) *Attorney, Agent, or Firm* — Nong-Qiang Fan (57) ABSTRACT

A lightpipe, which is mounted on one chassis part of an imaging module of an imaging reader, optically modifies an aiming beam emitted by an aiming laser, which is mounted on another chassis part of the imaging module, to generate and shape an aiming light pattern on a target. In one embodiment, at least one, or both, of the chassis parts are movable relative to each other to spatially adjust the aiming light pattern relative to an imaging field of view. In another embodiment, the aiming laser and the lightpipe are received in respective pockets of the chassis parts with clearance, and are adjustably fixed in place to spatially adjust the aiming light pattern relative to the imaging field of view.

20 Claims, 6 Drawing Sheets

COMPACT IMAGING MODULE WITH ADJUSTABLE AIMING PATTERN AND ARRANGEMENT FOR AND METHOD OF SPATIALLY ADJUSTING THE AIMING PATTERN

FIELD OF THE DISCLOSURE

The present disclosure relates generally to a solid-state imaging reader having a compact imaging module with an adjustable aiming pattern and, more particularly, to an arrangement for, and a method of, spatially adjusting the aiming pattern.

BACKGROUND

Solid-state imaging systems or imaging readers have been used, in both handheld and/or hands-free modes of operation, to electro-optically read targets, such as one- and two-dimensional bar code symbols to be decoded, as well as non-symbol targets or forms to be imaged. A known exemplary imaging reader includes a housing held by a user, a window supported by the housing and aimed at the target, and a scan engine or imaging module supported by the housing and having a solid-state imager (or image sensor) with a sensor array of photocells or light sensors (also known as pixels) that face forwardly toward the window, and an imaging lens assembly for capturing return light scattered and/or reflected from the target being imaged along an imaging axis through the window over an imaging field of view, and for projecting the return light onto the image sensor to initiate capture of an image of the target over a range of working distances in which the target can be read. Such an image sensor may include a one- or two-dimensional charge coupled device (CCD) or a complementary metal oxide semiconductor (CMOS) device and associated circuits for producing and processing electrical signals corresponding to a one- or two-dimensional array of pixel data over the imaging field of view. These electrical signals are decoded and/or processed by a programmed microprocessor or controller into information related to the target being read, e.g., decoded data indicative of a symbol target, or into a picture of a non-symbol target.

Since the user of the imaging reader cannot see exactly whether a target is located entirely within the imaging field of view of the image sensor, or know whether the target is optimally centrally located within the imaging field of view, the imaging module also typically includes an aiming light assembly for projecting a visible aiming light pattern, for example, a generally circular spot, or a cross-hairs, for placement at, or near, the center of the target, or an aiming line, or a series of generally circular spots linearly spaced apart, for placement lengthwise along the target, to assist the user in visually locating the target within the imaging field of view and, thus, advise the user in which direction the reader is to be moved in order to accurately spatially position the aiming light pattern on the target, especially prior to reading. The aiming light assembly includes at least one aiming light source, such as an aiming laser for emitting an aiming beam, an aiming lens, and a pattern shaping optical element, such as a diffractive optical element (DOE), or a refractive optical element (ROE). The focused light passing through a DOE forms multiple diverging beamlets, which project continuous lines or rows of spots arrayed in the aiming light pattern on the target to indicate the imaging field of view.

As advantageous as such known imaging readers have been, they have proven to be less than satisfactory in certain situations. For example, the aiming light assembly is typically mounted on the imaging module at a distance of a few millimeters away from the image sensor. In such event, the aiming light pattern is offset from the imaging field of view, and the offset worsens with increasing working distance. This offset problem is particularly acute when a one-dimensional image sensor that is, for example, only one pixel tall, is employed because an offset of even a few millimeters cannot be tolerated for efficient reading performance.

To counter this offset problem, it is known to steer the aiming pattern to overlap the imaging field of view by moving the aiming lens relative to the aiming laser. However, this movement is constrained, because the aiming laser has to be coaxial with an outside diameter of the aiming lens. Also, this movement to counter the offset problem may concomitantly degrade focusing of the aiming light emitted by the aiming laser. Further complicating the offset problem and the possible focusing degradation is that there is often simply not enough room to gain access to the aiming lens and/or to allow such movement. There are many space-limited applications where a miniaturized, highly compact, imaging module is desired and, in such cases, the offset problem is unsolved and just tolerated.

Accordingly, there is a need to easily spatially adjust the aiming pattern and/or to easily adjust the focusing of the aiming light, either independently or simultaneously, in a miniaturized, highly compact, imaging module for use in an imaging reader.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a compact imaging module (or scan engine) for an imaging reader. The imaging module may be mounted inside a housing of the reader and behind a window supported by the housing. The imaging module comprises an imaging assembly that includes a solid-state imaging sensor, and an imaging lens system for capturing return light from a target to be imaged over an imaging field of view of the imaging sensor, and for projecting the captured return light onto the imaging sensor. The imaging module further comprises an aiming light assembly that includes an aiming laser for emitting an aiming beam, and a lightpipe for optically modifying the aiming beam to generate and shape an aiming light pattern on the target. The lightpipe has an entry surface through which the aiming beam enters the lightpipe, an exit surface through which the aiming beam exits the lightpipe, and a pair of total internal reflecting surfaces between the entry and exit surfaces for twice folding the aiming beam to pass through the lightpipe along a double-folded path. The imaging module still further comprises a support assembly for spatially adjusting the aiming light pattern to at least partly overlap the imaging field of view.

The support assembly advantageously includes a first chassis part on which the aiming laser is mounted for joint movement therewith, and a second chassis part on which the lightpipe is mounted for joint movement therewith. At least one, or both, of the chassis parts are movable relative to each other to spatially adjust the aiming light pattern relative to the imaging field of view. Preferably, the first chassis part is constituted at least in part of a thermally conductive material, e.g., a metal material, to heatsink and dissipate heat from the aiming laser, and the second chassis part is constituted at least in part of a light-absorbing material, e.g., a plastic material with light-absorbing pigments. The second chassis part could also be constituted in whole or in part of a metal material.

The support assembly further advantageously includes a laser pocket in one of the chassis parts for receiving and accommodating the aiming laser with clearance, and a lightpipe pocket in another of the chassis parts for receiving and accommodating the lightpipe with clearance. The aiming laser and the lightpipe are moved inside their respective pockets in an alignment procedure until an adhesive is used for fixing the aiming laser in an adjusted position in the laser pocket, as well as for fixing the lightpipe in an adjusted position in the lightpipe pocket, thereby manipulating and spatially adjusting the aiming light pattern relative to the imaging field of view.

The lightpipe is advantageously a molded part of one-piece construction and made of an optically transparent plastic material. The lightpipe has opposite end portions for supporting the lightpipe in the lightpipe pocket, and a holding portion for holding the lightpipe during the alignment and fixing in the adjusted position. At least one, and preferably both, of the entry and exit surfaces of the lightpipe are configured with optical powers and with diffractive/refractive features to shape the aiming beam pattern. For example, the entry and exit surfaces can be rotationally symmetrical (e.g., spherical), or aspherical, or astigmatic, or cylindrical, or any other free shape. The pair of total internal reflecting surfaces are preferably flat and uncoated, but may also be configured with optical powers and with diffractive/refractive features to further shape the aiming beam pattern.

Another aspect of this disclosure relates to a method of spatially adjusting an aiming light pattern in an imaging reader. The method is performed by capturing return light from a target over an imaging field of view of a solid-state imaging sensor, projecting the captured return light onto the imaging sensor, emitting an aiming beam from an aiming laser, optically modifying the aiming beam with a lightpipe to generate and shape an aiming light pattern on the target to be imaged, configuring the lightpipe with an entry surface through which the aiming beam enters the lightpipe, an exit surface through which the aiming beam exits the lightpipe, and a pair of total internal reflecting surfaces between the entry and exit surfaces for twice folding the aiming beam to pass through the lightpipe along a double-folded path, and spatially adjusting the aiming light pattern to at least partly overlap the imaging field of view.

Figure 1:
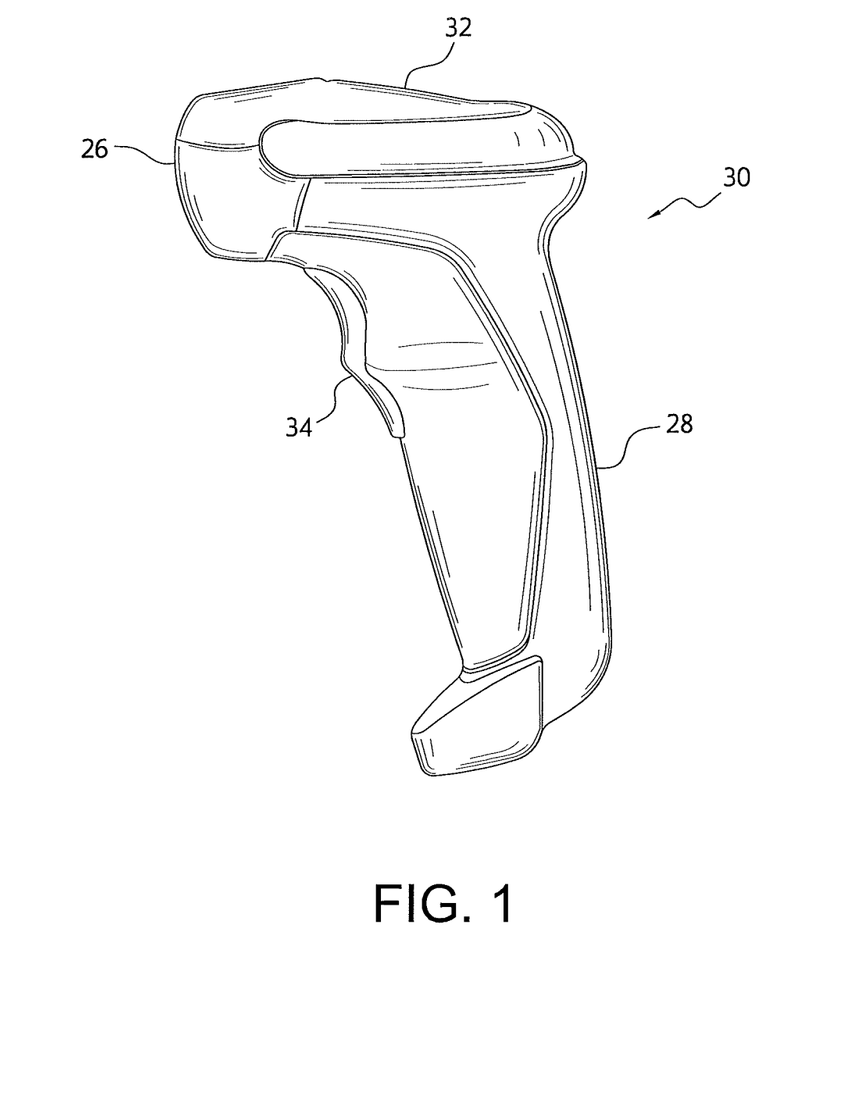
FIG. 1 is a side elevational view of a portable handheld imaging reader for electro-optically reading targets to be read by image capture that can use and benefit from the present disclosure.

Turning now to the drawings, reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of a target, especially one-dimensional symbols, to be read in a range of working distances relative to the window 26. Housings of other configurations can also be employed.

Figure 2:
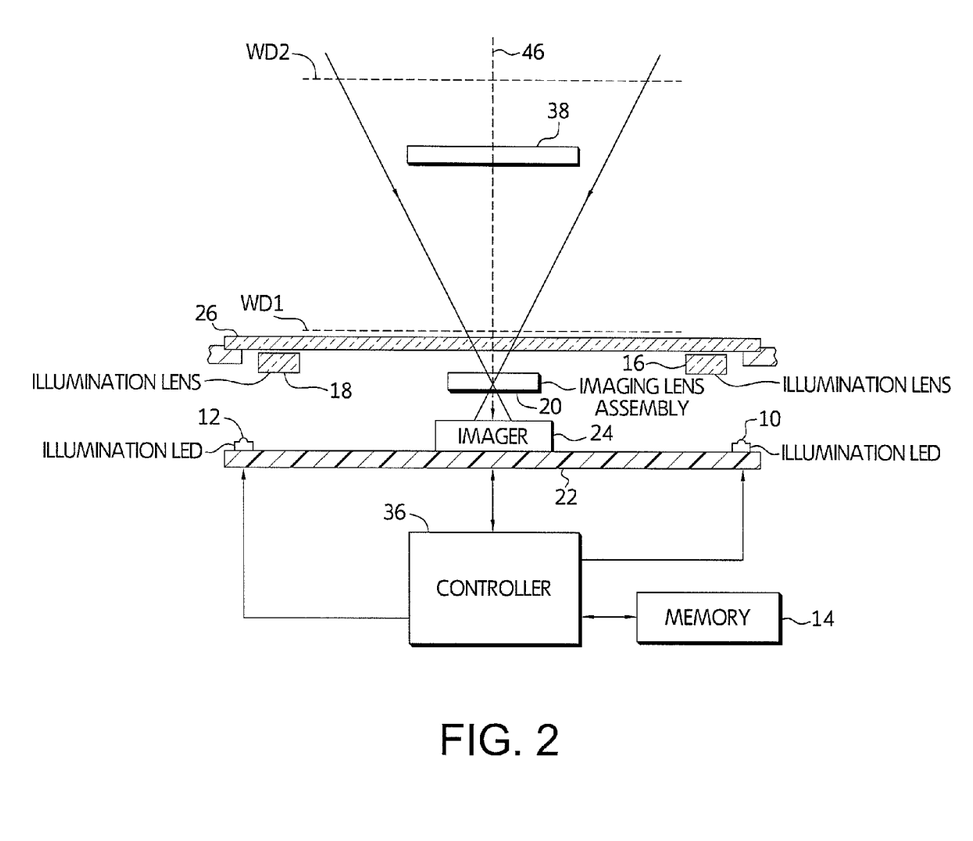
FIG. 2 is a schematic diagram of various components of the imaging reader of FIG. 1.
Figure 3:
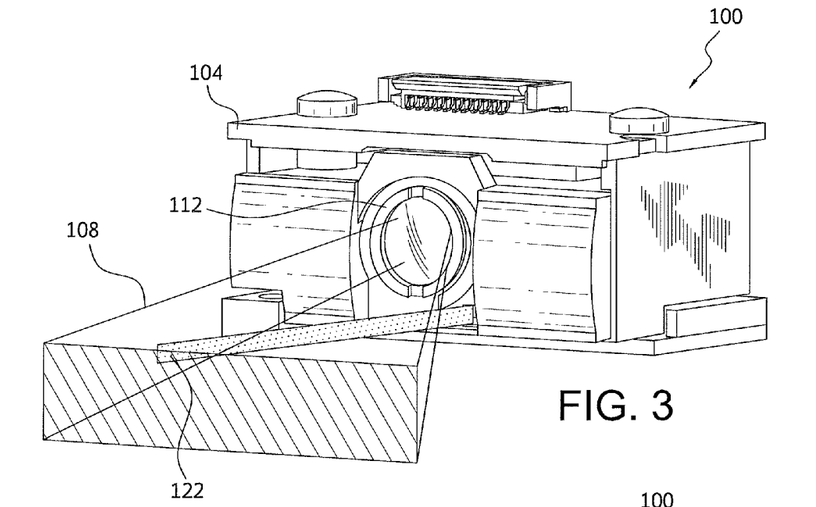
FIG. 3 is a perspective view of an imaging module for use in the reader of FIG. 1.
Figure 4:
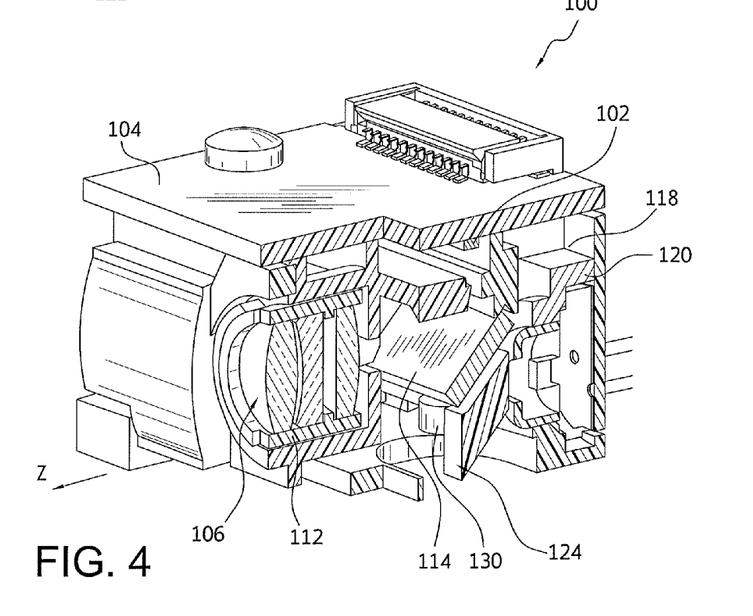
FIG. 4 is a part-sectional, part-broken-away, perspective view of the imaging module of FIG. 3.

As schematically shown in FIG. 2, an imaging assembly includes an imager or image sensor 24 mounted on a printed circuit board (PCB) 22 in the reader 30. The imager 24 is a solid-state device, for example, a CCD or a CMOS imager having a one-dimensional array of addressable photocells or pixels arranged in a single, linear row, and operative for detecting return light captured by an imaging lens assembly 20 along an imaging axis 46 through the window 26 over a linear imaging field of view (FOV). The return light is scattered and/or reflected from a target or symbol 38 over the imaging FOV that is generally perpendicular to the imaging axis 46.

The imaging lens assembly 20 is operative for projecting the return light onto the array of pixels to enable the symbol 38 to be read. The symbol 38 may be located anywhere in a working range of distances between a close-in working distance (WD1) and a far-out working distance (WD2). In a preferred embodiment, WD1 is less than about one-half inch from the window 26, and WD2 can be about thirty inches or more from the window 26.

An illuminating light assembly is optionally mounted in the imaging reader and includes an illumination light source, e.g., at least one light emitting diode (LED), and preferably a plurality of LEDs, such as a pair of illumination LEDs 10, 12 mounted on the PCB 22, and a pair of illumination lenses 16, 18 configured to generate a substantially uniform distributed illumination pattern of light on and along the symbol 38 to be read by image capture. At least part of the scattered and/or reflected return light is derived from the illumination pattern of light on and along the symbol 38. The window 26 is tilted to avoid reflections of the illumination light from the LEDs 10,12 from reaching the imaging lens assembly 20.

Although in some applications, the illuminating light assembly itself can serve as an aiming aid, it is preferred to provide a separate aiming light assembly to increase the range at which aiming light patterns can be seen on symbols and also to help counter the effect of sunlight washing out the aiming light patterns. The separate aiming light assembly is also mounted in the imaging reader, and includes an aiming light source, e.g., an aiming laser, as described below in connection with FIGS. 3-8, operative for emitting an aiming beam, and a lightpipe, as also described below in connection with FIGS. 3-8, for shaping the aiming beam emitted by the aiming light source to project an aiming light pattern on the symbol 38. The aiming pattern can be a generally circular aiming spot, or a cross-hairs, or a plurality of generally circular aiming spots, or an aiming line, or any light pattern.

As diagrammatically shown in FIG. 2, the image sensor 24 and the illumination LEDs 10, 12 are operatively connected to a controller or programmed microprocessor 36 operative for controlling the operation of these components. A memory 14 is connected and accessible to the controller 36. Preferably, the microprocessor 36 is also used for processing the electrical signals from the image sensor 24 and for processing and decoding the captured target images. The controller 36 and the memory 14 are advantageously mounted on the PCB 22.

In operation, the microprocessor 36 sends command signals to initially energize the aiming light source to project an aiming light pattern on the target symbol 38, and then, to energize the illumination LEDs 10, 12 for a short exposure time period, say 500 microseconds or less, and to energize and expose the image sensor 24 to collect the return light, e.g., illumination light and/or ambient light, from the target symbol 38 only during said exposure time period. A typical array needs about 18-33 milliseconds to acquire the entire target image and operates at a frame rate of about 30-60 frames per second.

Figure 5:
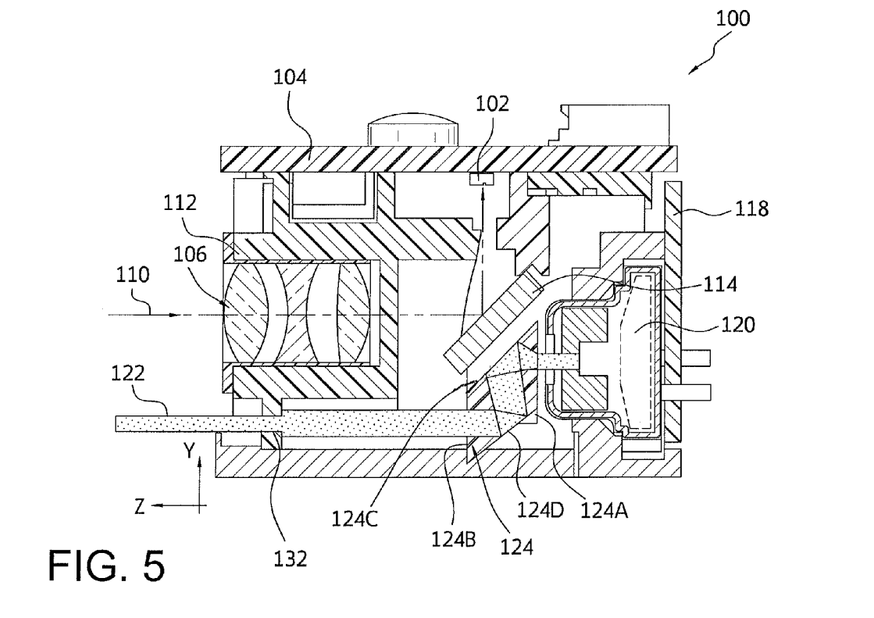
FIG. 5 is a side sectional view of the imaging module of FIG. 3.

Turning now to FIGS. 3-8, reference numeral 100 generally identifies a generally parallelepiped, compact imaging module (or scan engine) for the imaging reader 30. The imaging module 100 is mounted inside the housing of the reader 30 behind the window 26. The imaging module 100 comprises an imaging assembly that includes a solid-state imaging sensor 102 (analogous to image sensor 24) mounted on a lower surface of a top PCB 104, and an imaging lens assembly 106 (analogous to imaging lens assembly 20) for capturing return light along an optical axis 110 from the target 38 to be imaged over an imaging field of view 108 (schematically depicted in FIG. 3) of the imaging sensor 102, and for projecting the captured return light onto the imaging sensor 102. As best shown in FIG. 5, the captured return light passes along the optical axis 110 and is reflected and redirected by a fold mirror 114 along a folded light path to the imaging sensor 102. The imaging sensor 102 is preferably configured as a one-dimensional array, but could be configured as a two-dimensional array. The imaging lens assembly 106 is preferably configured as a Cooke triplet, and the three lenses are mounted along the optical axis 110 and held in place within a cylindrical optical holder 112.

The imaging module 100 further comprises an aiming light assembly that includes an aiming laser 120 for emitting a diverging aiming beam 122 (shown speckled in FIGS. 3 and 5), and a lightpipe 124 (see also FIGS. 9-10) for optically modifying the diverging aiming beam 122 to generate and shape an aiming light pattern on the target 38. As best shown in FIG. 5, the lightpipe 124 has an entry surface 124A through which the diverging aiming beam 122 enters the lightpipe 124, an exit surface 124B through which the aiming beam 122 (now nearly collimated) exits the lightpipe 124, and a pair of total internal reflecting surfaces 124C, 124D between the entry surface 124A and the exit surface 124B for twice folding the diverging aiming beam 122 to pass through the lightpipe 124 along a double-folded path. The aiming laser 120 is mounted on an interior surface of a rear PCB 118.

The lightpipe surfaces 124A, 124B, 124C and 124D bound a generally parallelepiped, optical block that is approximately between 2 and 8 mm and is made and molded out of optically transparent material for the aiming beam 122. For example, a polycarbonate plastic, Zeonex®, an acrylic plastic, etc., are preferred optical materials for the lightpipe. After passing through the entry surface 124A, the aiming beam 122 undergoes a total internal reflection (TIR) on the upper TIR surface 124C and is reflected from the upper TIR surface 124C towards the lower TIR surface 124D, where the aiming beam 122 undergoes another total internal reflection (TIR) prior to passing through the exit surface 124B. In a preferred embodiment, the entry surface 124A and/or the exit surface 124B may each be configured with an optical power and with a surface figure to shape the aiming beam 122, and the upper and lower TIR surfaces 124C, 124D are preferably uncoated and flat. However, it has to be understood that the upper and lower TIR surfaces 124C, 124D may also have additional beam shaping properties and contain diffractive/refractive type features to further shape the aiming pattern. For example, the lower TIR surface 124D can advantageously be configured with a diffractive/refractive grating that creates a horizontal, elongated, aiming line, or other desired aiming pattern. The entry and/or exit surfaces 124A, 124B may each be configured as rotationally symmetrical (e.g., spherical), or aspherical, or astigmatic, or cylindrical, or any other free shape.

The nearly collimated aiming beam 122 that exits the exit surface 124B is preferably passed through an aperture stop 132 (see FIG. 5) prior to exiting the module 100. In a preferred embodiment, the aperture stop 132 is smaller than a clear aperture of the exit surface 124B. In a variation, a plastic molded aperture stop with TIR can be integrated directly into the exit surface 124B.

As described so far, the aiming beam 122 emitted by the aiming laser 120 is focused and shaped by, and passes through, the lightpipe 124, and preferably through the aperture stop 132, to the exterior of the imaging module 100 and forms an aiming light pattern in space. The folded path of the captured return light and the double-folded path of the aiming beam 122 contribute to making the module 100 very small in volume. As discussed above, it is desired to spatially adjust the aiming pattern and/or to adjust the focusing of the aiming beam, either independently or simultaneously, in a miniaturized, highly compact, imaging module 100 so that the aiming light pattern at least partly overlaps the imaging field of view 108 of the image sensor 102.

Figure 7:
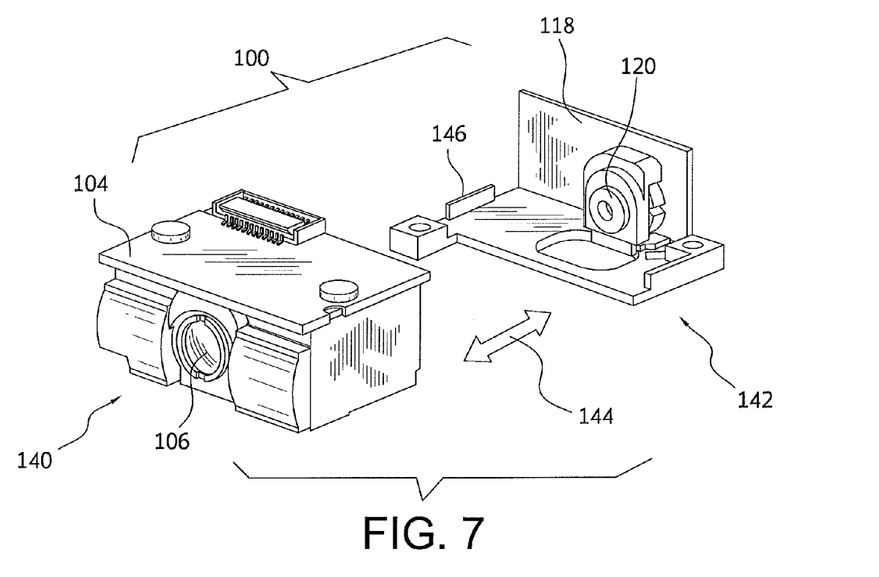
FIG. 7 is an exploded, perspective view of the imaging module of FIG. 3.

In accordance with one aspect of this disclosure, a support assembly enables such adjustment and/or focusing. As best shown in FIG. 7, the support assembly includes a first chassis part 140 and a second chassis part 142. The imaging sensor 102, the top PCB 104, the imaging lens assembly 106, the holder 112, the mirror 114, the lightpipe 124, and the aperture stop 132 are all mounted on the first chassis part 140 for joint movement therewith. The aiming laser 120 and the rear PCB 118 are both mounted on the second chassis part 142 for joint movement therewith. Movement of either chassis part, or of both chassis parts, along the optical axis 110 (i.e., the Z-axis) in either direction of the double-headed arrow 144 changes the distance between the aiming laser 120 and the lightpipe 124, thereby focusing the aiming beam 122. A linear guide flange 146 maintains the linear movement along the optical axis 110. An adhesive, or a connector, can be used to fix the first and second chassis parts 140, 142 in their adjusted position.

Preferably, the second chassis part 142 is constituted at least in part of a thermally conductive material, e.g., a metal material, to heatsink and dissipate heat from the aiming laser 120, and the first chassis part 140 is constituted at least in part of a light-absorbing material, e.g., a plastic material with light-absorbing pigments. More particularly, the aiming laser 120 is pressed in, glued, or otherwise attached to a metal portion of the second chassis part 142 to provide an adequate heat transfer between the aiming laser 120 and the metal portion. Since the module has strict requirements as to surface finish and color, it is preferred to have the second chassis part 142 of a black color with a matte finish and to be free of residual particles and debris. A metal chassis portion is preferably made by a casting process to achieve the desired color and finish. The plastic material of the first chassis part 140 preferably contains a light-absorbing pigment, such as polycarbonate, or a blend of acrylonitrile butadiene styrene (ABS) and polycarbonate, and does not require any additional processing to match color and finish specifications, or to satisfy corrosion resistance requirements. The first chassis part 140 could also be constituted in whole or in part of a metal material.

Figure 8:
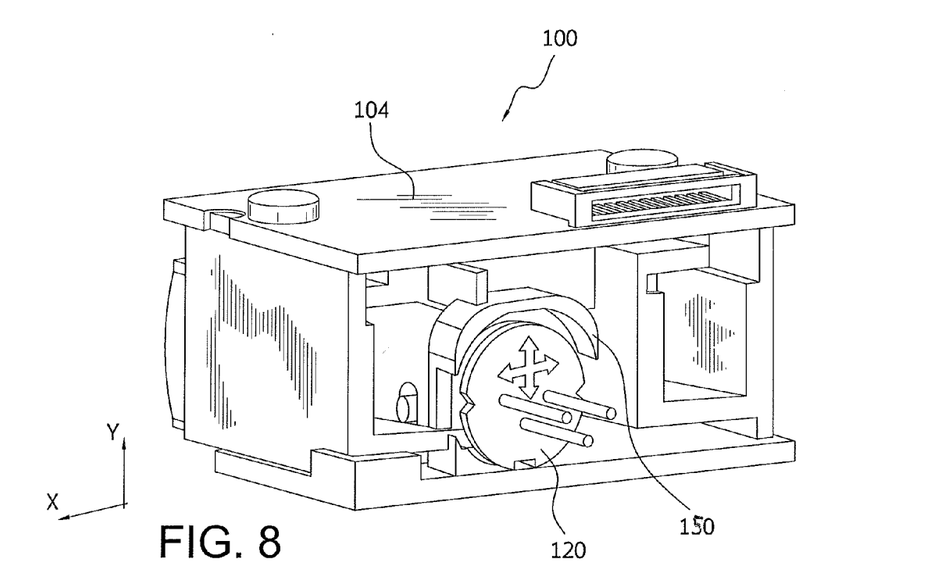
FIG. 8 is a rear perspective view of the imaging module of FIG. 3.

As best shown in FIG. 8, the support assembly further advantageously includes a laser pocket 150 in the second chassis part 142 for receiving and accommodating the aiming laser 120 with clearance. As shown, the laser pocket 150 is oversized, and there is clearance for the aiming laser 120 to be moved up-and-down along the vertical (or Y-axis), as well as from side-to-side along the horizontal (or X-axis). An adhesive, or a connector, can be used to fix the aiming laser 120 once the latter has been moved to its adjusted position.

Figure 6:
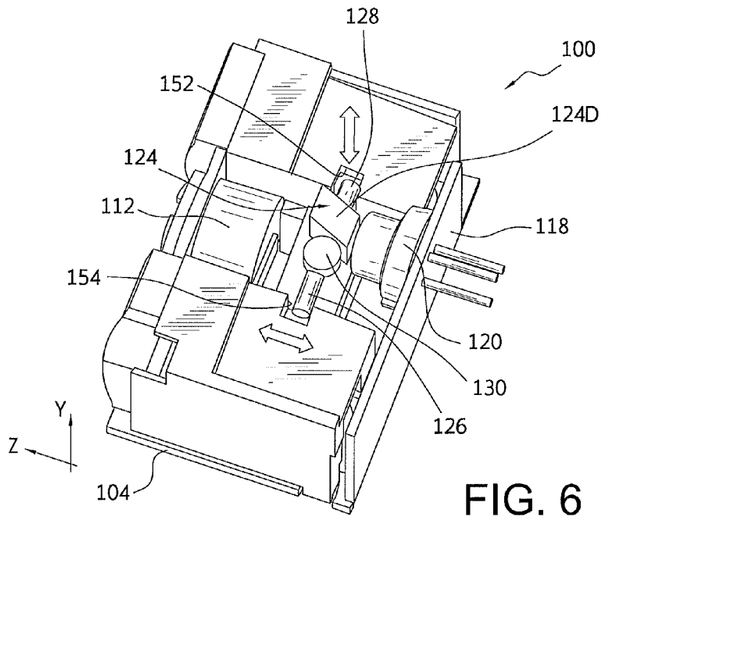
FIG. 6 is a bottom perspective view as seen from below the imaging module of FIG. 3.

As best shown in FIG. 6, the lightpipe 124 is advantageously a molded part of one-piece construction and made of an optically transparent plastic material. The lightpipe 124 also has a pair of opposite end portions 126, 128 and a cylindrical holding portion 130. The support assembly further advantageously includes a pair of lightpipe pockets 152, 154 in the first chassis part 140 for receiving and accommodating the lightpipe 124, and, more particularly, the end portions 126, 128, with clearance. As shown, each lightpipe pocket is oversized, and there is clearance for the lightpipe 124 to be moved up-and-down along the vertical (or Y-axis), as well as forward-and-back along the optical axis 110 (or Z-axis). An adhesive, or a connector, can be used to fix the lightpipe 124 once the latter has been moved to its adjusted position. During this adjustment procedure, the lightpipe 124 is advantageously held at the holding portion 130 by a suction apparatus.

Figure 9:
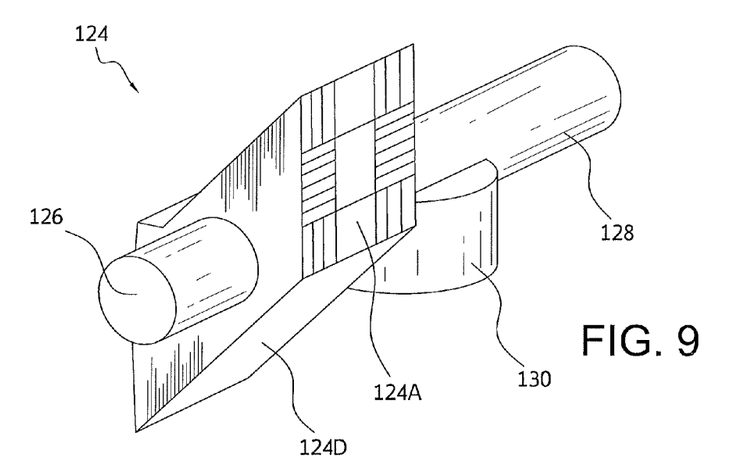
FIG. 9 is an enlarged front perspective view of a lightpipe in isolation as used in the imaging module of FIG. 3.
Figure 10:
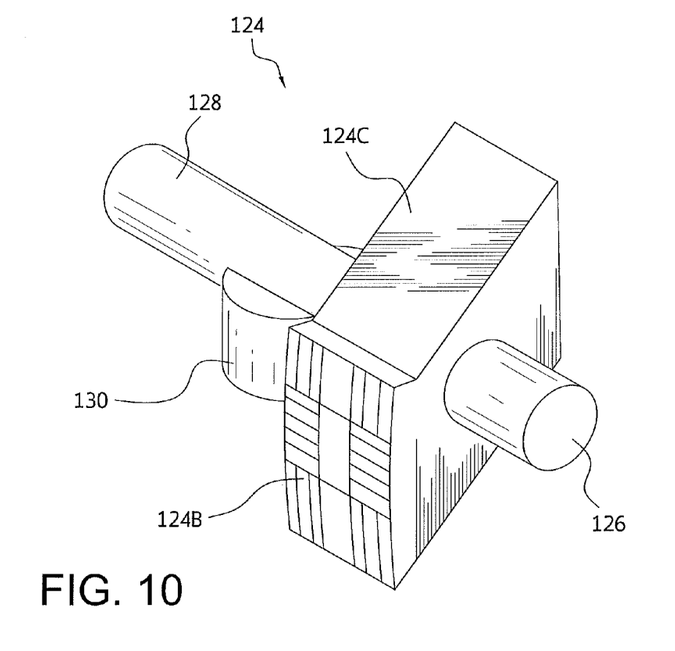
FIG. 10 is an enlarged rear perspective view of the lightpipe of FIG. 9.

FIGS. 9 and 10 depicts the lightpipe 124 in isolation. The various surfaces 124A, 124B, 124C and 124D are illustrated, together with the end portions 126, 128 and the cylindrical holding portion 130. Refractive features, e.g., grooves, are likewise schematically and exemplarily illustrated on the surfaces 124A, 124B.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A compact imaging module for an imaging reader, comprising:
    an imaging assembly including a solid-state imaging sensor, and an imaging lens system for capturing return light from a target to be imaged over an imaging field of view of the imaging sensor, and for projecting the captured return light onto the imaging sensor;
    an aiming light assembly including an aiming laser for emitting an aiming beam, and a lightpipe for optically modifying the aiming beam to generate and shape an aiming light pattern on the target, the lightpipe having an entry surface through which the aiming beam enters the lightpipe, an exit surface through which the aiming beam exits the lightpipe, and a pair of total internal reflecting surfaces between the entry and exit surfaces for twice folding the aiming beam to pass through the lightpipe along a double-folded path to form the aiming light pattern that at least partly overlaps the imaging field of view, wherein the entry surface and the exit surface are parallel to each other; and
    a support assembly for spatially adjusting the aiming light pattern relative to the imaging field of view.

2. The imaging module of claim 1, wherein the support assembly includes a first chassis part on which the aiming laser is mounted for joint movement therewith, and a second chassis part on which the lightpipe is mounted for joint movement therewith, and wherein at least one of the chassis parts is movable relative to the other of the chassis parts to spatially adjust the aiming light pattern relative to the imaging field of view.

3. The imaging module of claim 2, wherein the first chassis part is constituted at least in part of a thermally conductive material to heatsink the aiming laser, and wherein the second chassis part is constituted at least in part of a light-absorbing material.

4. The imaging module of claim 1, wherein the support assembly includes a chassis part having a laser pocket for receiving the aiming laser with clearance, and an adhesive for fixing the aiming laser in an adjusted position in the laser pocket to spatially adjust the aiming light pattern relative to the imaging field of view.

5. The imaging module of claim 1, wherein the support assembly includes a chassis part having a lightpipe pocket for receiving the lightpipe with clearance, and an adhesive for fixing the lightpipe in an adjusted position in the lightpipe pocket to spatially adjust the aiming light pattern relative to the imaging field of view.

6. The imaging module of claim 5, wherein the lightpipe is a molded part of one-piece construction and made of an optically transparent plastic material, and wherein the lightpipe has opposite end portions for supporting the lightpipe in the lightpipe pocket, and a holding portion for holding the lightpipe during the fixing in the adjusted position.

7. The imaging module of claim 1, wherein at least one of the entry and exit surfaces of the lightpipe has a diffractive/refractive feature to shape the aiming beam pattern.

8. An arrangement for spatially adjusting an aiming light pattern in an imaging reader, the arrangement comprising:
    a housing;
    a window supported by the housing; and
    a compact imaging module mounted in the housing, the imaging module having
        an imaging assembly including a solid-state imaging sensor, and an imaging lens system for capturing return light from a target to be imaged through the window over an imaging field of view of the imaging sensor, and for projecting the captured return light onto the imaging sensor,
        an aiming light assembly including an aiming laser for emitting an aiming beam, and a lightpipe for optically modifying the aiming beam to generate and shape an aiming light pattern through the window on the target, the lightpipe having an entry surface through which the aiming beam enters the lightpipe, an exit surface through which the aiming beam exits the lightpipe, and a pair of total internal reflecting surfaces between the entry and exit surfaces for twice folding the aiming beam to pass through the lightpipe along a double-folded path to form the aiming light pattern that at least partly overlaps the imaging field of view, wherein the entry surface and the exit surface are parallel to each other, and
        a support assembly for spatially adjusting the aiming light pattern relative to the imaging field of view.

9. The arrangement of claim 8, wherein the support assembly includes a first chassis part on which the aiming laser is mounted for joint movement therewith, and a second chassis part on which the lightpipe is mounted for joint movement therewith, and wherein at least one of the chassis parts is movable relative to the other of the chassis parts to spatially adjust the aiming light pattern relative to the imaging field of view.

10. The arrangement of claim 9, wherein the first chassis part is constituted at least in part of a thermally conductive material to heatsink the aiming laser, and wherein the second chassis part is constituted at least in part of a light-absorbing material.

11. The arrangement of claim 8, wherein the support assembly includes a chassis part having a laser pocket for receiving the aiming laser with clearance, and an adhesive for fixing the aiming laser in an adjusted position in the laser pocket to spatially adjust the aiming light pattern relative to the imaging field of view.

12. The arrangement of claim 8, wherein the support assembly includes a chassis part having a lightpipe pocket for receiving the lightpipe with clearance, and an adhesive for fixing the lightpipe in an adjusted position in the lightpipe pocket to spatially adjust the aiming light pattern relative to the imaging field of view.

13. The arrangement of claim 12, wherein the lightpipe is a molded part of one-piece construction and made of an optically transparent plastic material, and wherein the lightpipe has opposite end portions for supporting the lightpipe in the lightpipe pocket, and a holding portion for holding the lightpipe during the fixing in the adjusted position.

14. The arrangement of claim 8, wherein at least one of the entry and exit surfaces of the lightpipe has a diffractive/refractive feature to shape the aiming beam pattern.

15. A method of spatially adjusting an aiming light pattern in an imaging reader, comprising:
- capturing return light from a target over an imaging field of view of a solid-state imaging sensor, projecting the captured return light onto the imaging sensor;
- emitting an aiming beam from an aiming laser;
- optically modifying the aiming beam with a lightpipe to generate and shape an aiming light pattern on the target to be imaged;
- configuring the lightpipe with an entry surface through which the aiming beam enters the lightpipe, an exit surface through which the aiming beam exits the lightpipe, and a pair of total internal reflecting surfaces between the entry and exit surfaces for twice folding the aiming beam to pass through the lightpipe along a double-folded path to form the aiming light pattern that at least partly overlaps the imaging field of view, wherein the entry surface and the exit surface are parallel to each other; and
- spatially adjusting the aiming light pattern relative to the imaging field of view.

16. The method of claim 15, and mounting the aiming laser on a first chassis part for joint movement therewith, and mounting the lightpipe on a second chassis part for joint movement therewith, and moving at least one of the chassis parts relative to the other of the chassis parts to spatially adjust the aiming light pattern relative to the imaging field of view.

17. The method of claim 15, and receiving the aiming laser in a laser pocket of a chassis part with clearance, and fixing the aiming laser in an adjusted position in the laser pocket to spatially adjust the aiming light pattern relative to the imaging field of view.

18. The method of claim 15, and receiving the lightpipe in a lightpipe pocket of a chassis part with clearance, and fixing the lightpipe in an adjusted position in the lightpipe pocket to spatially adjust the aiming light pattern relative to the imaging field of view.

19. The method of claim 18, and holding the lightpipe during the fixing in the adjusted position.

20. The method of claim 15, and configuring at least one of the entry and exit surfaces of the lightpipe with a diffractive/refractive feature to shape the aiming beam pattern.

* * * * *